US007992156B1

(12) United States Patent
Wang

(10) Patent No.: US 7,992,156 B1
(45) Date of Patent: Aug. 2, 2011

(54) DETERMINING THE ADDRESS OF A SYSTEM CALL TABLE TO PERFORM ANTIVIRUS TASKS IN A COMPUTER

(75) Inventor: Chih Mu Wang, Taoyuan (TW)

(73) Assignee: Trend Micro Incorporated, Tokyo (JP)

( * ) Notice: Subject to any disclaimer, the term of this patent is extended or adjusted under 35 U.S.C. 154(b) by 1521 days.

(21) Appl. No.: 11/397,529

(22) Filed: Apr. 3, 2006

(51) Int. Cl.
*G06F 13/00* (2006.01)
(52) U.S. Cl. ........... 719/328; 726/24; 713/164; 713/188
(58) Field of Classification Search .................. 719/328; 726/24; 713/164, 188
See application file for complete search history.

(56) References Cited

U.S. PATENT DOCUMENTS

| | | | | |
|---|---|---|---|---|
| 6,959,441 | B2 * | 10/2005 | Moore | 719/328 |
| 7,216,367 | B2 * | 5/2007 | Szor | 726/25 |
| 7,587,724 | B2 * | 9/2009 | Yeap | 719/328 |
| 7,735,138 | B2 * | 6/2010 | Zhao | 726/24 |
| 7,900,258 | B2 * | 3/2011 | van der Made | 726/24 |

OTHER PUBLICATIONS

System Call—Wikipedia, the free encyclopedia. [online] [Retrieved on Mar. 10, 2006]. Retrieved from the Internet.
Kernel Space Definition. [online] [Retrieved on Mar. 10, 2006]. Retrieved from the Internet.

* cited by examiner

*Primary Examiner* — Andy Ho
(74) *Attorney, Agent, or Firm* — Okamoto & Benedicto LLP

(57) ABSTRACT

In one embodiment, an address of a system call table is determined by invoking a first system call from a user-level program running in user space. When the first system call executes, the first system call retrieves the address of the system call table from kernel stack, which that has been populated by the kernel with various data including the address of the system call table. Using the retrieved address to locate the system call table, the system call table is modified to allow interception of calls made to one or more system calls included in the system call table. This allows a scan module to scan data for computer viruses before a system call is allowed to execute and operate on the data, for example.

15 Claims, 3 Drawing Sheets

DETERMINING THE ADDRESS OF A SYSTEM CALL TABLE TO PERFORM ANTIVIRUS TASKS IN A COMPUTER

BACKGROUND OF THE INVENTION

1. Field of the Invention

The present invention relates generally to data processing, and more particularly but not exclusively to system calls and antivirus.

2. Description of the Background Art

Computer operating systems are well known. Generally speaking, an operating system is a program that manages computer resources and other programs, which are referred to as "application programs." A kernel is the core of the operating system and provides basic services for all other components of the operating system and application programs. Application programs and the kernel employ different and distinct regions of computer memory. Application programs are user-level programs and accordingly run in user space of the memory. On the other hand, the kernel runs in kernel space of the memory, which is generally restricted to kernel operations.

Generally speaking, a system call provides an interface to a kernel service, which may involve a low-level operation typically reserved for the kernel. Application programs may invoke a system call using the C programming language library, for example. References to system calls may be stored in a system call table, which may be thought of as an array containing the addresses of all available system calls. In UNIX-like operating systems, the address of the system call table is typically included in the so-called "system.map," which is a text file generated after the kernel is compiled and linked. Application programs that need access to system calls may thus examine system.map to determine the address of the system call table. Unfortunately, some operating systems no longer include the address of the system call table in system-.map, thereby preventing these application programs from operating properly.

SUMMARY

In one embodiment, an address of a system call table is determined by invoking a first system call from a user-level program running in user space. When the first system call executes, the first system call retrieves the address of the system call table from kernel stack, which that has been populated by the kernel with various data including the address of the system call table. Using the retrieved address to locate the system call table, the system call table is modified to allow interception of calls made to one or more system calls included in the system call table. This allows a scan module to scan data for computer viruses before a system call is allowed to execute and operate on the data, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Computer viruses, worms, Trojans, and spyware are examples of malicious codes that have plagued computer systems throughout the world. Although there are technical differences between each type of malicious code, malicious codes are collectively referred to herein as "viruses." For example, commercially available "antivirus software" is designed to scan a computer for viruses as well as worms and other malicious codes.

The following embodiments are explained in the context of Intel™ x86 processor architecture and the Linux operating system for illustration purposes only, not as limitations.

Figure 1:
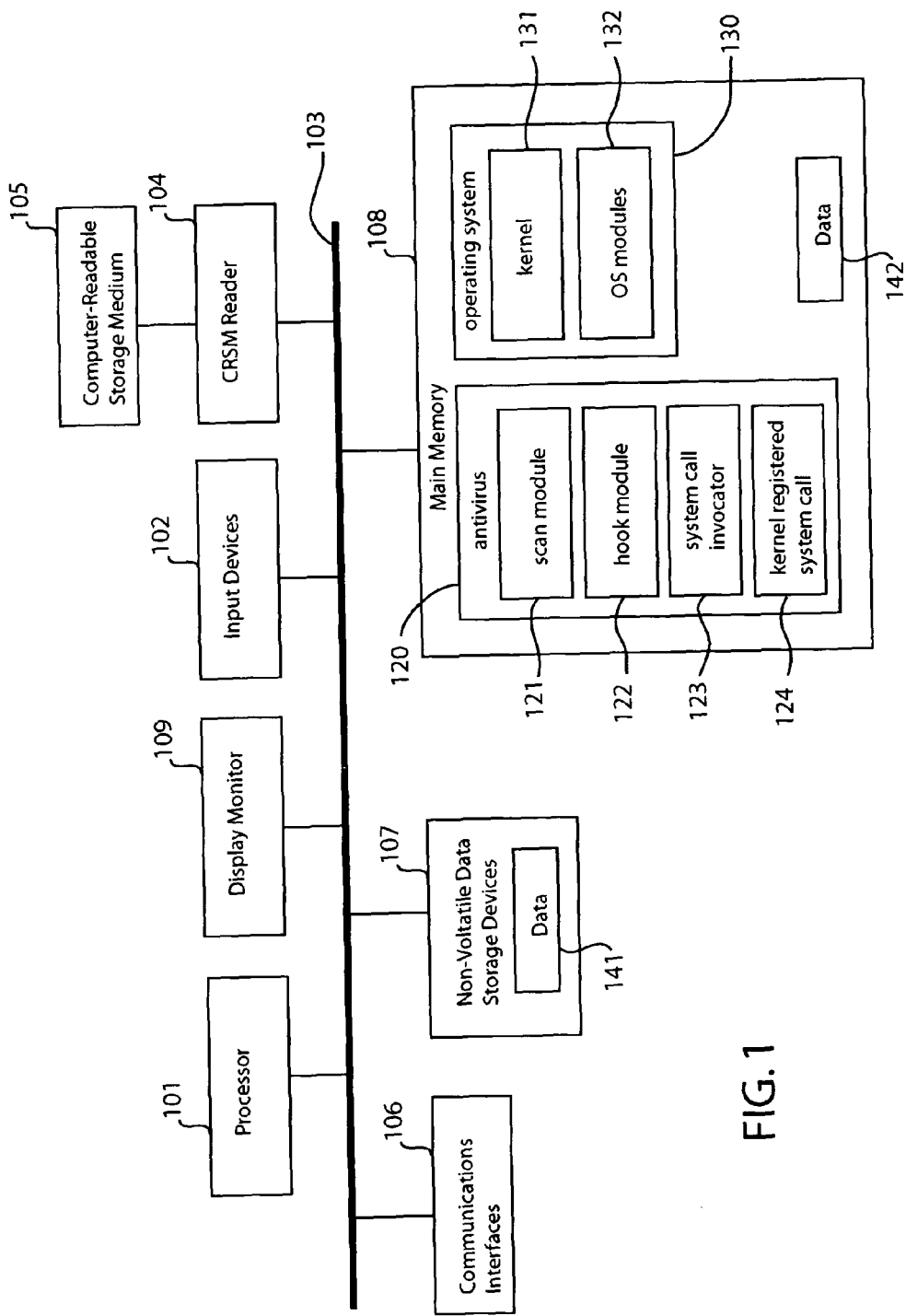
FIG. 1 shows a schematic diagram of an example computer that may be used in embodiments of the present invention.

FIG. 1 shows a schematic diagram of an example computer in accordance with an embodiment of the present invention. The computer of FIG. 1 may have less or more components to meet the needs of a particular application. As shown in FIG. 1, the computer may include a processor 101, which in one embodiment comprises an x86 (e.g., Pentium™) processor from the Intel Corporation. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), communications interfaces 106 (e.g., network adapters, modems) for communicating over computer networks, one or more non-volatile data storage devices 107 (e.g., hard disk drive, optical drive, FLASH memory), and a main memory 108 (e.g., RAM). Software embodiments may be stored in a computer-readable storage medium 105 for reading into a non-volatile data storage device 107 or main memory 108. Software embodiments may also be received over a computer network by way of a communications interface 106. In the example of FIG. 1, main memory 108 includes software modules of antivirus 120 and an operating system 130. Note that these software modules may also run in data storage locations other than main memory.

The operating system 130 may comprise a UNIX-like operating system, such as the Linux operating system. In one embodiment, the operating system 130 comprises a Linux operating system from Red Hat, designated RHAS4. As is conventional, the operating system 130 includes a kernel 131 and operating system modules 132. Operating system modules 132 comprise components of the operating system 130 other than the kernel 131.

The antivirus 120 may comprise computer-readable program code for scanning data for computer viruses. In one embodiment, the antivirus 120 is employed to scan data 141 in a non-volatile data storage device 107 or data 142 in the main memory 108 for viruses. The data 141 and 142 may comprise files, for example. In the example of FIG. 1, the antivirus 120 comprises a scan module 121, a hook module 122, a system call invocator 123, and a kernel registered system call 124.

The scan module 121 may comprise computer-readable program code for scanning data for viruses. The scan module 121 may employ any conventional algorithm for scanning data without detracting from the merits of the present invention. The mechanics of scanning data for viruses, in general, is well known and employed by antivirus products from a variety of vendors including Trend Micro, Inc., for example.

The hook module 122 may comprise computer-readable program code for redirecting to the scan module 121 calls made to particular system calls. In one embodiment, the hook module 122 intercepts calls made to a system call for a file operation (e.g., open, write, and read system calls), allows the scan module 121 to scan the file to be operated by the system call, and then lets the system call to proceed after the file has been scanned. For example, the system call may involve opening the file for reading or writing. In that case, the hook module 122 may intercept a call to the system call so that the scan module 121 can scan the file before it is opened by the system call. Depending on implementation, the scan module 121 may prevent the system call from proceeding altogether if the file is found to be infected with a virus.

In one embodiment, the hook module 122 determines the address of the system call table, locates the system call table using its address, and modifies entries in the system call table to redirect calls made to particular system calls. The system call table may have a reference to each system call of the kernel. For example, for each system call, the system call table may have an entry containing a pointer to the entry point of the system call. Jumping program execution to a pointer in the system call table jumps execution to the corresponding entry point to execute the system call. Pointers to entry points of system calls are arranged in the system call table such that a pointer (and hence the corresponding system call) may be accessed by using an offset to the address of the system call table. The system call table may thus be modified such that a pointer to an entry point of a particular system call is replaced with a pointer to an entry'point of the hook module 122 (or, in some embodiments, an entry point of the scan module 121). This way, a call made to that particular system call would instead go to the hook module 122, which can then allow the scan module 121 to perform antivirus scanning before allowing that particular system call to execute.

As mentioned, some operating systems do not include the address of the system call table in the kernel map and do not provide information on where the system call table is located in memory. To overcome this problem and allow for virus scanning, the antivirus 120 further includes the system call invocator 123 and the kernel registered system call 124 to obtain the address of a system call table regardless of whether or not it is listed in the kernel map.

The system call invocator 123 may comprise computer-readable program code for calling the kernel registered system call 124 to access kernel space in memory and induce the kernel 131 to place the address of the system call table in kernel space, and allow the kernel registered system call 124 to retrieve the address of the system call table from kernel space. In one embodiment, the system call invocator 123 comprises an application program running in user space. The system call invocator 123 may include an instruction to call the registered system call 124 by asserting an interrupt to trap into kernel space. Invocation of the registered system call 124 results in the kernel filling the kernel stack with the address of the system call table.

The kernel registered system call 124 may comprise computer-readable program code for retrieving the address of the system call table from kernel space. As its name implies, the system call 124 is registered with the kernel as a system call. This allows the system call 124 to be invoked by the kernel and run in kernel space. In one embodiment, the system call 124 is registered with the kernel by a user-level program running in user space. When the system call invocator 123 calls the system call 124, the kernel will populate the kernel stack with data that include the address of the system call table and the return address of the system call 124. The system call 124 will receive the call initiated by the system call invocator 123 and accordingly execute before the data in the kernel stack containing the address of the system call table are erased. The system call 124 may retrieve the address of the system call table from the kernel stack and store it in a variable. The data in the kernel stack will no longer be available when the system call 124 completes execution and returns to the system call invocator 124. However, at that time, the address of the system call table has already been stored in the variable and can be read by the system call invocator 123, the hook module 122, or other modules of the antivirus 120 that need access to the system call table.

The principle behind the system call invocator 123 and the kernel registered system call 124 is now explained using the ioctl system call of the Linux operating system (e.g., Red Hat Linux AS4) running on an x86 processor as an example. This example works equally well with other standard Linux system calls. Table 1 shows a portion of a user-level program code written in the C programming language for invoking the ioctl system call.

TABLE 1

Int ioctl ( )
{
...
...    (data preparation)
mov   $0x36,%eax    (0x36, 54 in decimal, is ioctl's system call number.)
int   $0x80
...
...    (process the return value returned by kernel.)
}

In the example of Table 1, the mov instruction places the system call number of ioctl in the eax register of the x86 processor. Execution of the int (interrupt) 0x80 instruction results in the processor looking up the interrupt descriptor table to find the routine for the interrupt 0x80, which is an interrupt to execute a system call. The system call dispatcher of the kernel receives the system call number and checks the system call table for the corresponding system call. A portion of a system call dispatcher, which is that of entry.s stored in the directory "arch/i386/" in this example, is shown in Table 2.

TABLE 2

ENTRY (system_call)
    pushl %eax          # save orig_eax
    SAVE_ALL
    GET_CURRENT (%ebx)
    testb $0x02,tsk_ptrace   (%ebx)    #PT_TRACESYS
    jne tracesys
    cmpl $(NR_syscalls), %eax
    jae badsys
    call *SYMBOL_NAME (sys_call_table) (,%eax,4)
    movl %eax,EAX(%esp)

When compiled, the instructions of Table 2 are translated to that shown in Table 3.

TABLE 3

| Addr | Machine Code | Assembly Code | |
|---|---|---|---|
| C0: | 50 | push | %eax |
| c1: | fc | cld | |
| c2: | 06 | push | %es |
| c3: | 1e | push | %ds |
| c4: | 50 | push | %eax |
| c5: | 55 | push | %ebp |
| c6: | 57 | push | %edi |
| c7: | 56 | push | %esi |
| c8: | 52 | push | %edx |
| c9: | 51 | push | %ecx |
| ca: | 53 | push | %ebx |
| cb: | ba 18 00 00 00 | mov | $0x18,%edx |
| d0: | 8e da | mov | %edx,%ds |
| d2: | 8e c2 | mov | %edx,%es |
| d4: | bb 00 e0 ff ff | mov | $0xffffe000,%ebx |
| d9: | 21 e3 | and | %esp,%ebx |
| db: | f6 43 18 02 | testb | $0x2,0x18 (%ebx) |
| df: | 75 5f | jne | 140 <tracesys> |
| e1: | 3d 00 01 00 00 | cmp | $0x100,%eax |
| e6: | 0f 83 81 00 00 00 | jae | 16d <badsys> |
| ec: | ff 14 85 XX XX XX XX | call | *0xXXXXXXXX (,%eax,4) |
| f3: | 89 44 24 18 | mov | %eax, 0x18(%esp,1) |

In the example of Table 3, the "XXXXXXXX" in the instruction in address "ec" represents the address of the system call table, while the instruction in address "f3" is the return address of the ioctl system call. The system call dispatcher is part of the kernel. Since the kernel must know the address of the system call table, the kernel fills up the "XXXXXXXX" in the instruction in address "ec" with the correct address of the system call table. After the instruction in address "ec" is executed, the processor will push the return address of the ioctl system call into the kernel stack. In x86 processors, the stack grows downwards from the highest address to the lowest address. In this example, execution of the ioctl system call results in the kernel stack having the layout shown in Table 4.

TABLE 4

| High address: | (esp0) | the base of kernel stack |
| | entry 1 | |
| | | | (pushed by processor) total of 24 bytes |
| | entry 6 | |
| | entry 7 | |
| | | | (pushed by Linux kernel) total of 40 bytes |
| | entry 16 | |
| Low address: | (esp0-16) | system call's return address |

The kernel stack of an x86 processor has several locations, with each location having an address and 4 bytes of binary data. In the example of Table 4, "esp0" represents an entry at the base of the kernel stack. Entries 1-6 represent data pushed by the processor into the kernel stack upon invocation of the ioctl system call, while entries 7-16 represent data pushed by the kernel. In the Linux operating system, entries 7-16 are pushed by the system call dispatcher, which is a kernel process responsible for processing system calls. The system call dispatcher uses the system call number to determine the system call to be invoked and allows that system call to execute. Still referring to Table 4, entry 16 is the address of the system call table, which is just above the ioctl system call's return address (see Table 3, addresses "ec" and "f3"). With this information, the address of the system call table may be obtained as follows:

(1) Get the starting address of the kernel stack—(current->thread.esp0).

(2) Subtract 16 entries from the starting address of the kernel stack to obtain the system call return address—(current->thread.esp0-16).

(3) Subtract 1 entry from the location of the system call return address in the kernel stack to access the address of the system call table—*(*((unsigned long **)(current->thread.esp0)-16)-1). Note that this leads to the end of the instruction in the address "ec" of Table 3 (i.e., "ff 14 85 XX XX XX XX"). Casting it to an integer and retrieving the 4 bytes provides the address of the system call table.

The just described example is in the context of an x86 processor. It is to be noted that the same technique may be adapted to another processor by knowing that processor's architecture and how it handles interrupts, stacks, and kernel operations. Such information is generally available from processor vendors.

Figure 2:
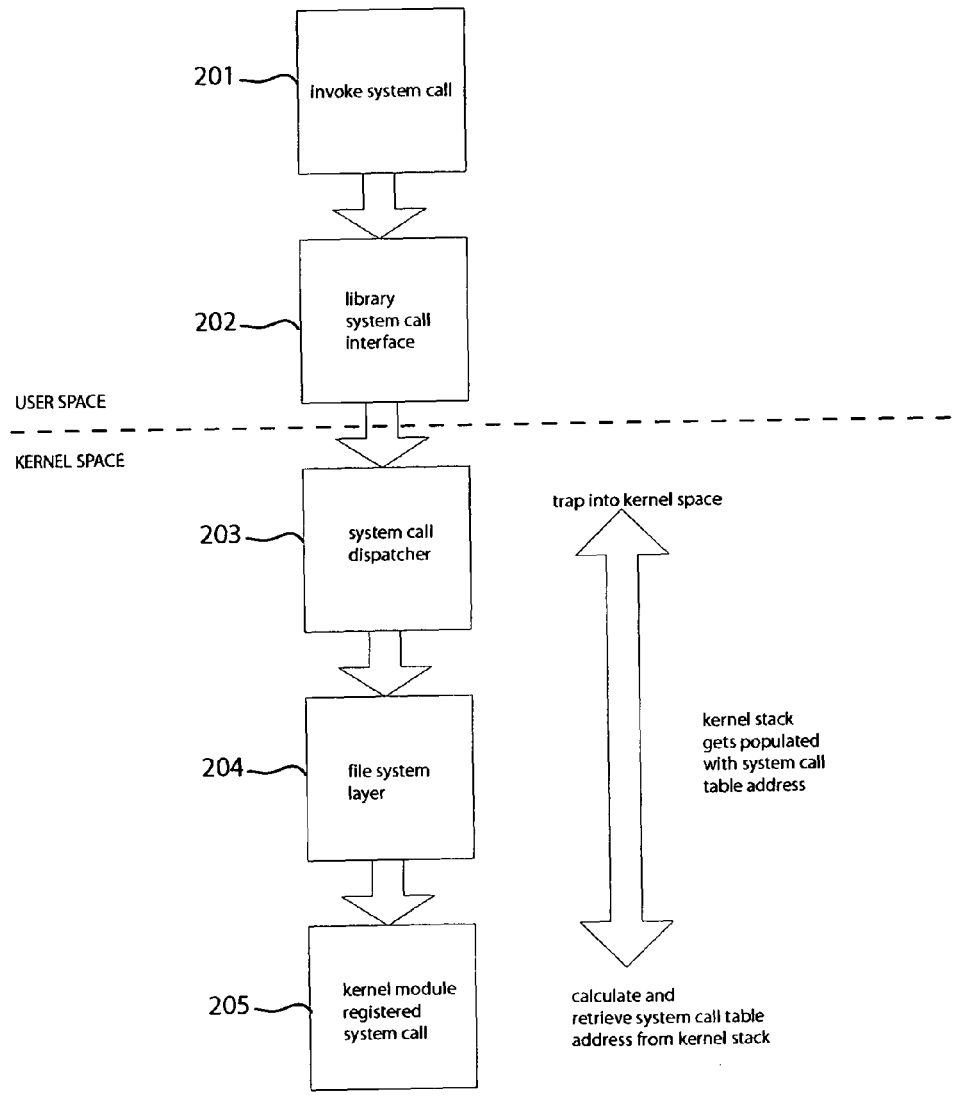
FIG. 2 shows a flow diagram of a method of determining an address of a system call table in accordance with an embodiment of the present invention.

Referring now to FIG. 2, there is shown a flow diagram of a method of determining an address of a system call table in accordance with an embodiment of the present invention. In the example of FIG. 2, actions in boxes 201 and 202 are executed in user space of the computer's memory, while actions in blocks 203, 204, and 205 are executed in kernel space of the memory. Generally speaking, system memory in UNIX-like operating systems may be divided into two distinct regions, namely kernel space and user space. Kernel space is where the kernel executes and provides its services. User space is where a user process (i.e., all processes other than the kernel) executes, a process being an instance of an executing program. The kernel manages individual user processes within the user space and prevents them from interfering with each other. A user process typically cannot access kernel space or another user process's user space. However, an active user process may access kernel space by invoking a system call.

In block 201, a system call is invoked by an application program (i.e., a user-level program) running in user space. Block 201 may be performed by the system call invocator 123 of FIG. 1, for example. In one embodiment, the system call is a kernel registered system call, such as the system call 124 of FIG. 1. The system call may be a modification of an existing system call generally available from the operating system. For example, the system call may be a modified version of the ioctl system call. The system call may be invoked by filling up register values then asserting a software interrupt that allows trapping into kernel space. For example, block 201 may be performed by a C language program that runs in the Linux operating system. The C language program may move the system call's number into the register eax of an x86 processor and then assert interrupt 0x80.

In block 202, the invocation of the system call is made using a programming language's library system call interface. In one embodiment, the invocation of the system call is made using the C programming language's library system call interface.

In block 203, the invocation of the system call executes a trap to enter the kernel space. The system call dispatcher gets the system call number to identify the system call that needs to be invoked.

In block 204, the system call dispatcher vectors branches to the system call, which in the example of FIG. 2 involves a file operation. Accordingly, the system call is executed through the operating system's file system layer. The file system layer may be the Virtual File System (VFS) layer of the Linux operating system, for example.

During blocks 203 and 204, the kernel stack gets populated with information that allows the processor to execute the instructions relating to the system call. Such information may include the return address of the system call and the system call table address.

In block 205, the system call invoked in block 201 is executed. In one embodiment, the system call includes instructions (i.e., computer-readable program code) for calculating the location where the system call address is located in the kernel stack and retrieving the system call address from the kernel stack. In the Linux operating system, the address of the kernel stack may be found in a data structure (e.g., current->thread.esp0). Knowing the location of the kernel stack and how the particular processor handles kernel stacks, the system call may calculate the location of the system call table in the kernel stack. The system call may then retrieve the address of the system call table and store it in a variable accessible to an application program so that the address of the system call table will remain available even after the system call returns. (The contents of the kernel stack are typically erased after the system call returns.) In one embodiment, the hook module 122 of the antivirus 120 (see FIG. 1) accesses the variable to get the address of the system call table. The hook module 122 uses the address to locate the system call table, then modifies one or more system call entry points in the system call table to redirect calls to the hook module 122 for forwarding to the scan module 121.

Figure 3:
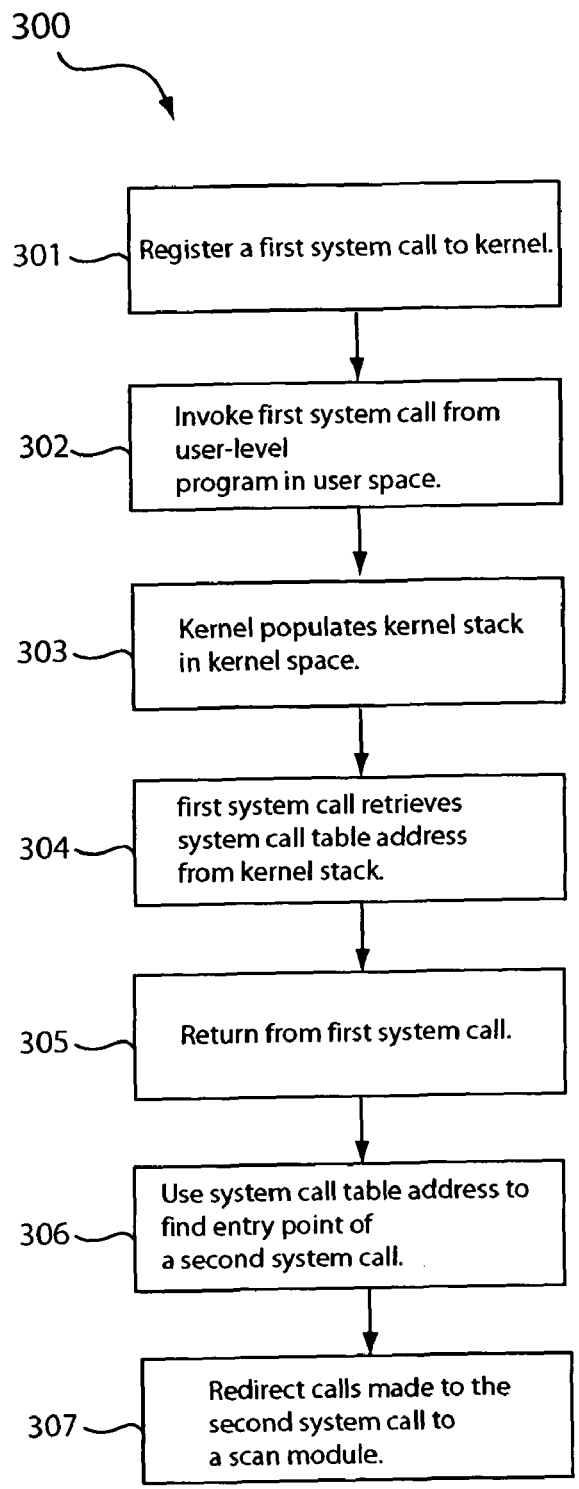
FIG. 3 shows a flow diagram of a method of determining the address of system call table in computer memory to perform an antivirus task in accordance with an embodiment of the present invention.

FIG. 3 shows a flow diagram of a method 300 of determining the address of a system call table in computer memory to perform an antivirus task in accordance with an embodiment of the present invention.

In step 301, a first system call (e.g., system call 124 of FIG. 1) is registered with the kernel. In one embodiment, the first system call is configured to retrieve an address of the system call table in kernel space. Registering the first system call with the kernel allows it to be invoked by the kernel and run in kernel space to retrieve the address of the system call table.

In step 302, a user-level program (e.g., system call invocator 123 of FIG. 1) executing in user space invokes (i.e., calls) the first system call.

In step 303, invocation of the first system call results in the kernel populating the kernel stack in kernel space with data that include the address of the system call table.

In step 304, the call reaches the first system call. The first system call operates in kernel space, allowing it to retrieve the address of the system call table from the kernel stack. The first system call then saves the address of the system call table in a variable or another storage location for later retrieval, for example.

In step 305, the execution of the first system call completes. The call then returns from the first system call and unwinds back to the user-level program that called the first system call.

In step 306, the address of the system call table is used to find the entry point of a second system call. The system call table may have pointers to entry points of all system calls supported by the kernel. Pointers to these entry points are typically stored in memory locations addressable as an offset from the address of the system call table. The location of these pointers for standard (i.e., comes with the operating system) system calls are well known. Thus, by knowing the address of the system call table, one can determine the address of a pointer to an entry point of a particular system call.

In step 307, calls made to the second system call are redirected (e.g., by hook module 122 of FIG. 1) to a hook module (e.g., hook module 122 of FIG. 1) for virus scanning. In one embodiment, the second system call is a standard file operation system call available in most UNIX-like operating systems. The system call table may be modified such that a pointer to an entry point of the second system call may be replaced by a pointer to an entry point of the hook module. In turn, the hook module may employ a scan module (e.g., scan module 121) to scan the file that will be operated by the system call. The scan module may scan the file for computer viruses before allowing the second system call to proceed.

As can be appreciated from the foregoing, embodiments of the present invention allow an antivirus to find the address of a system call table without relying on a kernel map. This advantageously allows antivirus functionalities to be performed in operating systems that do not include the address of the system call table in the kernel map or hides the address of the system call table altogether.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a computer having a memory and a processor, the method comprising:

invoking a first system call from a user-level program operating in user space of the memory, the first system call being included in a system call table comprising references to a plurality of system calls of a kernel of an operating system, the first system call being a system call in the plurality of system calls, retrieving an address of the system call table from a kernel stack populated by the kernel as a result of invocation of the first system call by the user-level program, the kernel stack being located in a kernel space of the memory;

using the address of the system call table to find a reference to a second system call in the system call table;

modifying the system call table to intercept a call to the second system call, the second system call being called to operate on a file; and scanning the file for viruses before allowing the second system call to execute to completion.

2. The method of claim 1 wherein the operating system comprises the Linux operating system.

3. The method of claim 1 wherein invoking the first system call from the user-level program comprises:

executing an instruction to assert a processor interrupt that allows access to the kernel space in the memory.

4. The method of claim 1 wherein retrieving an address of the system call table from the kernel stack comprises:

locating a return address of the first system call in the kernel stack; and locating the address of the system call table relative to the return address of the first system call in the kernel stack.

5. The method of claim 1 wherein the address of the system call table is retrieved from the kernel stack before the first system call completes and returns execution to the user-level program.

6. The method of claim 1 wherein the first system call stores the address of the system call table in a variable.

7. A computer comprising:

a scan module configured to scan a file for computer viruses;

a hook module configured to intercept a call to a second system call, the second system call being configured to operate on the file, the hook module being configured to modify a pointer to the second system call in a system call table, the system call table comprising pointers to entry points of system calls of a kernel of an operating system of the computer;

a first system call configured to retrieve the address of the system call table from a memory location in kernel space of the computer's memory; and a system call invocator configured to invoke the first system call from a user space of the computer's memory.

8. The computer of claim 7 wherein the operating system comprises the Linux operating system.

9. The computer of claim 7 wherein the first system call is registered with the kernel by a user-level program to include in the system call table a pointer to an entry point of the first system call.

10. The computer of claim 7 wherein the second system call is configured to open the file.

11. A method to be performed by a computer, the method comprising:

using a user-level program to register a first system call with a kernel of an operating system, the user-level program executing in a user space of a memory of the computer;

invoking the first system call to allow the first system call to execute and retrieve an address of a system call table from a kernel stack in a kernel space of the memory of the computer, the system call table comprising a reference to each system call of the kernel, the kernel being a core of an operating system;

storing the address of the system call table in a storage location before the first system call completes execution;

using the address of the system call table to locate the system call table and modify the system call table to intercept a call to a second system call; and scanning data for computer viruses before allowing the call to proceed to the second system call to operate on the data.

12. The method of claim 11 wherein the storage location comprises that of a variable.

13. The method of claim 11 wherein the data comprise a file.

14. The method of claim 11 wherein the operating system comprises the Linux operating system.

15. The method of claim 11 wherein the system call table is modified by replacing a pointer to an entry point of the second system call with a pointer to an entry point of a hook module.

\* \* \* \* \*